United States Patent Office 3,423,370
Patented Jan. 21, 1969

3,423,370
FILM AND FIBER FORMING COPOLYESTERS
Herbert Fitz and Walter Seifried, Wiesbaden-Biebrich, Germany, assignors to Kalle Aktiengesellschaft, Wiesbaden-Biebrich, Germany, a corporation of Germany
No Drawing. Filed Sept. 10, 1964, Ser. No. 395,548
Claims priority, application Germany, Sept. 13, 1963,
K 50,816
U.S. Cl. 260—75     3 Claims
Int. Cl. C08g 17/08

This invention is concerned with a process for the manufacture of novel, soft, elastic copolyesters.

Pure polyethylene terephthalate, in the form in which it is used on a large scale for the manufacture of fibres and films, has excellent properties, such as a high mechanical strength, a minor absorptivity for water and a good resistance to chemicals, but it has at the same time the disadvantage that for some uses it is too stiff and has an excessive tendency to crystallize. This makes it, for example, impossible to manufacture from pure polyethylene terephthalate stretched films, tubes and similar products of considerable thickness, which are clear and not stiff.

While it is relatively easy to reduce the undesirably high crystallization tendency of polyethylene terephthalate by replacing the fundamental carboxylic acid or diol component partially by compounds that, by their constitution, inhibit the formation of a crystallite structure, such as isophthalic acid or neopentylglycol, this does not reduce the stiffness to the desired degree. In fact, most of the copolyesters of this type are even more brittle than pure polyethylene terephthalate.

The present invention provides a process for the manufacture of copolyesters of high molecular weight by the melt condensation method, wherein an aromatic dicarboxylic acid or an alkyl ester thereof is polycondensed with a polymethyleneglycol and an aliphatic diol ether of the formula $HOCH_2-CH_2-X-CH_2-CH_2OH$, where X represents a methylenee ether bond member, which is composed of 3 to 16 atoms joined together in chain fashion and contains at most three ether oxygen atoms and, when two or three ether oxygen atoms are present, these atoms are in each case separated from one another by at least three intervening carbon atoms. The polyesters thereby produced have a reduced rigidity and crystallization tendency.

A group of diol ethers preferably used in the process of the invention may be represented by the formula $HOCH_2-(CH_2)_w-O_l-(CH_2)_x-O_m-(CH_2)_y-O_n-(CH_2)_z-CH_2OH$ where $l=1$, $m$ and $n$ each=0 or 1, $w$ and $z$ are each at least 1, and, if $m=1$ and $n=1$, $x$ and $y$ are each at least 3; if $m=0$ and $n=1$, $(x+y)$ is at least 3; if $m=1$ and $n=0$, $x$ is at least 3 and $y=0$ or a whole number; and if $m=0$ and $n=0$, $(x+y)=0$ or a whole number, the sum $l+m+n+w+x+y+z$ varying from 3 to 16. Suitable diol ethers are, for example, the following

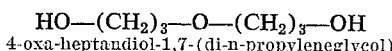
4-oxa-heptandiol-1,7-(di-n-propyleneglycol)

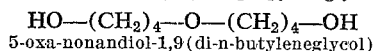
5-oxa-nonandiol-1,9(di-n-butyleneglycol)

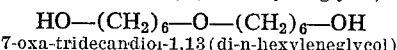
7-oxa-tridecandioi-1,13(di-n-hexyleneglycol)

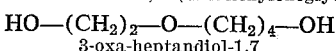
3-oxa-heptandiol-1,7

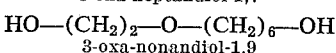
3-oxa-nonandiol-1,9

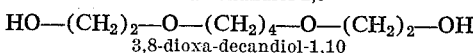
3,8-dioxa-decandiol-1,10

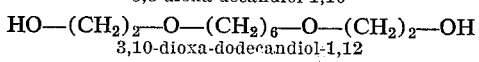
3,10-dioxa-dodecandiol-1,12

The first three compounds are given special preference.

The diol ethers of the formula $HOCH_2-CH_2-X-CH_2-CH_2OH$ may be branched in the aliphatic chain X by aliphatic alkyl radicals, for example methyl groups. Inter alia, there are also suitable, for example, the diol ethers obtainable from hexandiol-1,6 and propylene oxide or isobutylene oxide, and also compounds of a similar constitution.

The present process can also be performed with mixtures of diol ethers.

Diol ethers of the above type, combined in polyesters, display the action of "inner plasticisers." This feature is not limited to the system polyethylene terephthalate; it also applies to other similar polyesters consisting of an aromatic dicarboxylic acid and a polymethyleneglycol.

Thus, as polymethyleneglycol in the process of the invention not only ethyleneglycol, which is generally preferred, but also any other lower polymethyleneglycol can be used, especially one that contains 2 to 6 methylene groups, that is to say tri-, tetra-, penta- and hexa-methyleneglycol or mixtures thereof with one another or with ethyleneglycol.

The proportions of polymethyleneglycol and diol ether may vary within wide limits, depending on the desired properties of the copolyester. In general, it is desirable when the copolyester final product contains at least 10 mol percent, preferably 20 to 60 mol percent, of diol ether calculated on the total weight of the diol components. In some cases this proportion may even exceed 60 mol percent. Whereas the diol ether is used in a definite proportion in accordance with the desired final product, it is advantageous to use an excess of the diol in order to ensure a higher reaction speed. The molar ratio between the acid component and the sum of the diol and diol ether components is therefore advantageously from 1:2 to 1:2.5.

Aromatic dicarboxylic acids suitable for the manufacture of copolyesters according to this invention are those of the benzene, naphthalene and diphenyl series, also aromatic dicarboxylic acids in which the benzene nuclei containing the carboxyl groups may be linked together by a lower alkylene chain which may be interrupted by one or more oxygen atoms. Specifically, there may be mentioned: terephthalic acid, isophthalic acid, the various naphthalene dicarboxylic acids, especially 1,5- and 2,6-naphthalene dicarboxylic acid; p,p'-diphenyldicarboxylic acid, p,p'-diphenylmethane dicarboxylic acid, p,p'-diphenylethane dicarboxylic acid and p-carboxyphenylmethyl ether. Terephthalic acid is preferred for the polycondensation with an ethyleneglycol+diol ether mixture.

If desired, the dicarboxylic acid may be used in the form of one of its dialkyl esters, especially lower dialkyl esters, in which case primarily a reesterification between this ester and the polymethyleneglycol+diol ether mixture occurs, accompanied by liberation of the alkanol on which the dicarboxylic acid ester is based. Terephthalic acid is preferably used in the form of its dimethyl ester.

The present process for the manufacture of soft copolyesters is carried out by the melt condensation method without any special modifications. The aromatic dicarboxylic acid concerned, or its ester, for example, terephthalic acid, is first esterified or reesterified with a mixture consisting of the diol ether and the diol and then polycondensed, with the use of the known catalysts and, if desired, stabilizers. For the esterification or reesterification there are suitable, for example, compounds of metals of the I and II groups of the Periodic Table, for example, compounds of the alkali and alkaline earth metals, or of zinc and cadmium, and for the polycondensation those of the III to V groups of the Periodic Table, for example, the compounds of antimony, tin and titanium. Particularly suitable antioxidants and stabilizers are the acids of trivalent and pentavalent phosphorous and their salts and esters.

The average molecular weights of the copolyesters accessible by the present process range from about 15.000 to 30.000, which range is suitable for the manufacture of fibres and films.

Copolyesters with diol ethers of the above type of compounds with terephthalic acid as acid component are invariably colorless, soft, stretchable products having a good thermal stability. Depending on the amount and type of diol ether concerned, the melting points generally range from 160° to 200° C., which renders the copolyesters easy to process. Thus, the copolyesters are suitable, for example, for the manufacture of variable films, tubes, fibres and bristles.

Although the copolysters containing, for example, 50 mol percent of dial ether, obtained in this manner, are remarkably soft, they are still capable of crystallization and thus can be heatset. This latter property is of a desirably lesser order than the corresponding property of polyethylene terephthalate.

Another advantage in processing the copolyesters manufactured by the present process is their low glass point ($T_g$), which is generally below 25° C.; this enables the copolyesters to be drawn without additional heating. Compared with this, the glass point $T_g$ of pure polyethylene terephthalate is 69° C. Finally, the oriented and heatset copolyesters of the invention display advantageous shrinkage properties depending on the type and quantity of diol ether condensed in the product. They are, therefore, suitable for instance for the manufacture of shrinkable wrapping films and fibres.

Biaxially stretched and heatset films can be manufactured by the flat sheet or tube blowing process.

To manufacture flat sheets, the copolyester material is first melted in an extruder, the melt is then drawn off through a slit die as an amorphous film over a casting drum cooled below the glass point of the material and then drawn in the longitudinal direction by rollers maintained at a temperature above the glass point and then in the transverse direction by means of clip devices. The stretching operations may be carried out in the reverse order or simultaneously. Heat-setting is then performed in a heating zone maintained at a temperature of, for example, 120° to 150° C.

Essential requirements in the processing of the soft copolyesters referred to above are that in the first place the casting roller, on which the slit die deposits the melt in the form of a film, is to be maintained at a temperature below the glass point of the material and that the drawing in the longitudinal and in the transverse direction is carried out above the glass point. The former feature ensures that the soft material can be easily pulled off the casting drum without sticking to it, while the latter is of advantage because it enables the avoidance of excessive stretching forces.

To manufacture tubular films by the blowing method, the same type of procedure may in general be adopted. In this case the melt is drawn off from an annular slit die in tubular shape over a mandrel cooled to below the glass point, then heated in a succeeding heating zone above the glass point and finally drawn in the transverse direction by way of a superatmospheric pressure within the tube and in the longitudinal direction by increasing the draw-off rate. Heat-setting can be achieved in the usual manner at a temperature ranging, for example, from 120° to 150° C.

The copolyesters manufactured by the present process containing over 30 mol percent of diol ether, for example, dibutyleneglycol, are readily soluble in chlorinated hydrocarbons, for example, in methylene chloride, and can be used as adhesives or for the manufacture of soft, elastic layers.

The following Examples 1 to 3 illustrate the invention. Example 4 is given for comparison and describes the manufacture and properties of pure polyethylene terephthalate. The specific viscosities were measured at 25° C. in 1 percent solutions of the polyesters in 4:6-mixtures of tetrachlorethane and phenol. The indicated values of the differential thermoanalysis refer to a heating speed of 2° C. per minute of the material tested. $T_g$ indicates the glass point, $T_k$ the crystallization point and $T_s$ the crystallite melting point.

EXAMPLE 1

Manufacture of a copolyester containing 50 mol percent of dibutyleneglycol

A mixture of 1500 grams of terephthalic acid dimethyl ester, 720 grams of ethyleneglycol, 625 grams of di-n-butyleneglycol and 338 mg. of zinc acetate dihydrate as reesterification catalyst was quantitatively reesterified in a polycondensation apparatus made from stainless steel within 4 hours at 170° to 220° C., with elimination of methanol. 450 mg. of antimony trioxide as condensation catalyst and 375 mg. of triphenylphosphite as antioxidant were then added. While distilling off glycol, a vacuum of 0.4 mm. Hg was then maintained during 30 minutes at 250° C., and the batch was then polycondensed for 2 hours at 275° C. under 0.4 mm. Hg pressure. The resulting melt was extruded in the form of a film strip 300µ thick and 14 cm. wide through a slit die located on the bottom of the reaction vessel. Cuttings of the resulting, extremely soft, amorphous material were then biaxially drawn in a stretching apparatus at a drawing ratio of 1:4 (surface area increase: 16 times) at room temperature and then heat-set for 15 seconds at 115° C. The tested specimens revealed the following values:

(a) Film, amorphous, undrawn

Specific gravity (at 20° C.) _____ 1.2625
Specific viscosity _____ 0.72

DIFFERENTIAL THERMOANALYSIS $$T_g = +15°\ C.$$
$$T_k = 76.5°\ C.$$
$$T_s = 188°\ C.$$

(b) Film, drawn, heat-set

Specific gravity _____ 1.2945
Tensile strength _____kiloponds/mm.$^2$__ 10.7
Elongation _____percent__ 129

SHRINKAGE

At, ° C.: Percent
80 _____ 4
90 _____ 14
100 _____ 24

EXAMPLE 2

Manufacture of a copolyester containing 35 mol percent of dibutyleneglycol

A mixture of 1500 grams of terephthalic acid dimethyl ester, 840 grams of ethyleneglycol and 437 grams of di-n-butyleneglycol was polycondensed by the method and in the apparatus described in Example 1. Catalyst system, time, temperature and pressure conditions were exactly the same. The resulting amorphous film strip was then drawn in the stretching apparatus at a drawing ratio of 1:4 and heat-set for 15 seconds at 150° C. The material displayed the following properties:

(a) Film, undrawn

Specific gravity (at 20° C.) _____ 1.2913
Specific viscosity _____ 0.84

DIFFERENTIAL THERMOANALYSIS $$T_g = 26.5°\ C.$$
$$T_k = 114°\ C.$$
$$T_s = 214°\ C.$$

(b) Film, drawn, heat-set

Specific gravity (at 20° C.) _____ 1.3208
Tensile strength _____kiloponds/mm.² __ 9.4
Elongation _____percent __ 120

SHRINKAGE

| At, °C.: | Percent |
|---|---|
| 80 | 1 |
| 90 | 1.7 |
| 100 | 2 |

EXAMPLE 3

Manufacture of a copolyester containing 30 mol percent of di-n-hexyleneglycol

A mixture of 1500 grams of terephthalic acid dimethyl ester, 815 grams of ethyleneglycol and 507 grams of di-n-hexyleneglycol was reesterified as described in Example 1, then mixed with $Sb_2O_3$-triphenylphosphite, polycondensed for 3 hours at 275° C. under 0.4 mm. Hg pressure and finally stretched film material was manufactured as described in Example 2.

The drawn, heat-set films had a tensile strength of 11 to 13 kiloponds/mm.², an elongation of 150% and melted at 190° C.

EXAMPLE 4

Manufacture of pure polyethylene terephthalate

A mixture of 1500 grams of terephthalic acid dimethyl ester and 960 grams of ethyleneglycol was reesterified and then polycondensed as described in Example 1. The resulting film strip was then drawn at 95° C. at a drawing ratio of 1:4 and then heat-set for 15 seconds at 200° C.

(a) Film, amorphous, undrawn

Specific gravity (at 20° C.) _____ 1.3311
Specific viscosity _____ 0.85

DIFFERENTIAL THERMOANALYSIS $T_g = 69°$ C.
$T_k = 126°$ C.
$T_s = 262.5°$ C.

(b) Film, drawn, not heat-set

Tensile strength _____kiloponds/mm.² __ 22
Elongation _____percent __ 65

SHRINKAGE

| At, °C.: | Percent |
|---|---|
| 80 | 2.4 |
| 90 | 7 |
| 100 | 19 |

(c) Film, drawn, heat-set

Specific gravity (at 20° C.) _____ 1.3893

It will be obvious to those skilled in the art that many modifications may be made within the scope of the present invention without departing from the spirit thereof, and the invention includes all such modifications.

What is claimed is:

1. A film and fiber forming copolyester of high molecular weight which is the polycondensation product of a mixture consisting essentially of terephthalic acid or an alkyl ester thereof with a polymethyleneglycol and an aliphatic diol ether of the formula $$HOCH_2-CH_2-X-CH_2-CH_2OH$$

where X is a methylene ether bond member containing 3 to 16 atoms joined together in chain fashion and contains at most three ether oxygen atoms and, when more than one ether oxygen atom is present, they are in each case separated from each other by at least three intervening carbon atoms.

2. A copolyester according to claim 1 in which the proportions of the components are such that the resulting copolyester contains at least 10 mole percent of diol ether, based on the total weight of diol components.

3. A copolyester according to claim 1 in which at least one diol ether selected from the group consisting of di-n-propyleneglycol, di-n-butyleneglycol, and di-n-hexyleneglycol is employed.

References Cited

UNITED STATES PATENTS

| 3,013,914 | 12/1961 | Willard | 260—75 |
| 3,050,548 | 8/1962 | Munro et al. | 260—75 |
| 2,895,946 | 7/1959 | Huffman | 260—75 |

FOREIGN PATENTS

| 885,049 | 8/1959 | Great Britain. |

WILLIAM H. SHORT, *Primary Examiner.*

L. P. QUAST, *Assistant Examiner.*